US009603006B2

(12) United States Patent
Evans et al.

(10) Patent No.: US 9,603,006 B2
(45) Date of Patent: Mar. 21, 2017

(54) MANAGING MOBILE DEVICE IDENTITIES

(75) Inventors: Timothy Paul Evans, Newbury (GB); James Peter Tagg, Crockham Hill (GB); Alistair James Campbell, London (GB)

(73) Assignee: Truphone Limited (GB)

( * ) Notice: Subject to any disclaimer, the term of this patent is extended or adjusted under 35 U.S.C. 154(b) by 221 days.

(21) Appl. No.: 13/236,253

(22) Filed: Sep. 19, 2011

(65) Prior Publication Data

US 2013/0072257 A1    Mar. 21, 2013

(51) Int. Cl.
*H04B 1/38*  (2015.01)
*H04W 8/20*  (2009.01)
*H04W 12/04*  (2009.01)
*H04W 8/12*  (2009.01)

(52) U.S. Cl.
CPC ........... *H04W 8/205* (2013.01); *H04W 12/04* (2013.01); *H04W 8/12* (2013.01)

(58) Field of Classification Search
CPC .......................... H04M 2250/14; H04B 1/3816
USPC ...................................... 455/558, 551, 552.1
See application file for complete search history.

(56) References Cited

U.S. PATENT DOCUMENTS

| | | | |
|---|---|---|---|
| 5,754,639 A | 5/1998 | Flockhart | |
| 5,974,325 A | 10/1999 | Kotzin | |
| 5,974,328 A | 10/1999 | Lee | |
| 6,212,372 B1 | 4/2001 | Julin | |
| 6,738,622 B1 | 5/2004 | Stadelmann | |
| 6,839,659 B2 | 1/2005 | Tarassenko | |
| 6,978,156 B1 | 12/2005 | Papadopoulos | |
| 7,072,941 B2 | 7/2006 | Griffin | |
| 7,284,002 B2 | 10/2007 | Doss | |
| 7,346,696 B2 | 3/2008 | Malik | |

(Continued)

FOREIGN PATENT DOCUMENTS

| | | |
|---|---|---|
| AU | 2001268892 B2 | 3/2003 |
| CA | 2453569 A1 | 1/2003 |

(Continued)

OTHER PUBLICATIONS

Embedded SIM Remote Provisioning Architecture Version 1.1 Dec. 17, 2013.

(Continued)

*Primary Examiner* — Chuck Huynh

(57) ABSTRACT

A method of managing identities for use in a mobile telecommunications device in a telecommunications network is described. First of all, an identity management process is triggered. After this, one or more parameters associated with the mobile telecommunications device is detected. The identity management process than has the following features. An identity management rule determined by the one or more parameters is detected. An identity database is then searched. Each record of the identity database comprises an identity and additional identity information for each identity, wherein the searching prioritizes records according to the identity management rule. An identity is then selected when a record conforming to the identity management rule is found in said searching. The active identity of the mobile telecommunications device is then changed to be the selected identity when the active identity is not already the selected identity. A subscriber identity module adapted for use with this method is described.

18 Claims, 7 Drawing Sheets

(56) References Cited

U.S. PATENT DOCUMENTS

| | | |
|---|---|---|
| 7,706,791 B2 | 4/2010 | Heutschi |
| 8,031,871 B2 | 10/2011 | Beaudou |
| 8,185,156 B2 | 5/2012 | Camilleri |
| 8,255,877 B2 | 8/2012 | Vong |
| 8,345,640 B2 | 1/2013 | Bradley |
| 8,880,038 B2 | 11/2014 | Bramwell |
| 8,938,220 B2 | 1/2015 | Kho |
| 2001/0033644 A1 | 10/2001 | Offer |
| 2002/0024947 A1 | 2/2002 | Luzzatti |
| 2002/0120779 A1 | 8/2002 | Teeple |
| 2002/0155847 A1 | 10/2002 | Weinberg |
| 2002/0197991 A1 | 12/2002 | Anvekar |
| 2003/0037103 A1 | 2/2003 | Salmi |
| 2003/0040314 A1 | 2/2003 | Hogan |
| 2003/0065777 A1 | 4/2003 | Mattila |
| 2003/0108039 A1 | 6/2003 | Shell |
| 2003/0135596 A1 | 7/2003 | Moyer |
| 2003/0138095 A1 | 7/2003 | Stroud |
| 2003/0208567 A1 | 11/2003 | Gross |
| 2004/0001480 A1 | 1/2004 | Tanigawa |
| 2004/0176092 A1* | 9/2004 | Heutschi ............... 455/435.1 |
| 2004/0205158 A1 | 10/2004 | Hsu |
| 2004/0218045 A1 | 11/2004 | Bodnar |
| 2005/0027867 A1 | 2/2005 | Mueller |
| 2005/0044191 A1 | 2/2005 | Kamada |
| 2005/0070278 A1 | 3/2005 | Jiang |
| 2005/0075106 A1 | 4/2005 | Jiang |
| 2005/0085225 A1 | 4/2005 | Benco |
| 2005/0090239 A1 | 4/2005 | Lee |
| 2005/0096086 A1 | 5/2005 | Singamsetty |
| 2005/0101323 A1 | 5/2005 | de Beer |
| 2005/0107038 A1 | 5/2005 | Coutts |
| 2005/0107109 A1 | 5/2005 | Gunaratnam |
| 2005/0164737 A1 | 7/2005 | Brown |
| 2005/0181734 A1 | 8/2005 | Coutts |
| 2005/0182802 A1 | 8/2005 | Beaudou |
| 2005/0210104 A1 | 9/2005 | Torvinen |
| 2005/0235363 A1 | 10/2005 | Hibbard |
| 2005/0260973 A1 | 11/2005 | van de Groenendaal |
| 2006/0041844 A1 | 2/2006 | Homiller |
| 2006/0077941 A1 | 4/2006 | Alagappan |
| 2006/0094423 A1 | 5/2006 | Sharma |
| 2006/0106806 A1 | 5/2006 | Sperling |
| 2006/0168026 A1 | 7/2006 | Keohane |
| 2006/0190591 A1 | 8/2006 | Bobde |
| 2006/0193321 A1 | 8/2006 | Shell |
| 2006/0210034 A1 | 9/2006 | Beadle |
| 2006/0268738 A1 | 11/2006 | Goerke |
| 2006/0276226 A1 | 12/2006 | Jiang |
| 2006/0288077 A1 | 12/2006 | Chen |
| 2007/0054665 A1* | 3/2007 | Elkarat et al. ............ 455/432.1 |
| 2007/0099632 A1 | 5/2007 | Choksi |
| 2007/0129078 A1* | 6/2007 | De Beer ................. 455/445 |
| 2007/0178933 A1 | 8/2007 | Nelson |
| 2007/0213050 A1 | 9/2007 | Jiang |
| 2007/0223678 A1 | 9/2007 | Brunnekreef |
| 2007/0266118 A1 | 11/2007 | Wilkin |
| 2008/0004014 A1 | 1/2008 | Palviainen |
| 2008/0183866 A1 | 7/2008 | Maeda |
| 2008/0208567 A1 | 8/2008 | Brockett |
| 2008/0293408 A1 | 11/2008 | Jiang |
| 2008/0311907 A1 | 12/2008 | Watson |
| 2009/0029684 A1 | 1/2009 | Rosenblatt |
| 2009/0215449 A1 | 8/2009 | Avner |
| 2009/0264122 A1 | 10/2009 | van Loon |
| 2009/0325558 A1 | 12/2009 | Pridmore |
| 2010/0015949 A1 | 1/2010 | Bradley |
| 2010/0042600 A1 | 2/2010 | Orr |
| 2010/0075668 A1 | 3/2010 | Pan |
| 2010/0128685 A1 | 5/2010 | Jiang |
| 2010/0136967 A1 | 6/2010 | Du |
| 2010/0159924 A1 | 6/2010 | Lagerman |
| 2010/0273521 A1 | 10/2010 | Vong |
| 2010/0290424 A1 | 11/2010 | Collingrige |
| 2010/0311418 A1 | 12/2010 | Shi |
| 2010/0311468 A1 | 12/2010 | Shi |
| 2011/0159843 A1 | 6/2011 | Heath |
| 2011/0235786 A1 | 9/2011 | Barker |
| 2011/0269423 A1 | 11/2011 | Schell |
| 2011/0294472 A1 | 12/2011 | Bramwell |
| 2012/0143921 A1 | 6/2012 | Wilson |
| 2012/0190354 A1 | 7/2012 | Merrien |
| 2012/0238323 A1 | 9/2012 | Camilleri |
| 2012/0331137 A1 | 12/2012 | Olsen |
| 2013/0086602 A1 | 4/2013 | Mikan |
| 2013/0095795 A1 | 4/2013 | Shi |
| 2013/0102306 A1 | 4/2013 | Sachanandani |
| 2013/0283047 A1 | 10/2013 | Merrien |
| 2014/0031035 A1 | 1/2014 | Tagg |
| 2014/0141839 A1 | 5/2014 | Larsson |
| 2014/0227996 A1 | 8/2014 | Tuilier |
| 2014/0228039 A1 | 8/2014 | Zhao |
| 2015/0004967 A1 | 1/2015 | Jiang |
| 2015/0038117 A1 | 2/2015 | Tuilier |
| 2015/0289140 A1 | 10/2015 | Rudolph |
| 2016/0080930 A1 | 3/2016 | Larsson |

FOREIGN PATENT DOCUMENTS

| | | |
|---|---|---|
| CN | 1341332 A | 3/2002 |
| CN | 1533679 A | 9/2004 |
| CN | 1266978 C | 7/2006 |
| CN | 101841788 B | 9/2010 |
| DK | 1407629 T3 | 8/2007 |
| EP | 0579655 B1 | 1/1994 |
| EP | 1033048 B1 | 9/2000 |
| EP | 1061720 | 12/2000 |
| EP | 1117220 A1 | 1/2001 |
| EP | 1239687 A1 | 9/2002 |
| EP | 1316237 B1 | 6/2003 |
| EP | 1321005 B1 | 6/2003 |
| EP | 1332641 B1 | 8/2003 |
| EP | 1407629 B1 | 4/2004 |
| EP | 1519552 A1 | 3/2005 |
| EP | 1626552 A2 | 2/2006 |
| EP | 1691565 A1 | 8/2006 |
| EP | 1703760 A2 | 9/2006 |
| EP | 1727383 A1 | 11/2006 |
| EP | 1744527 A1 | 1/2007 |
| EP | 1830551 A2 | 9/2007 |
| EP | 1850625 A1 | 10/2007 |
| EP | 1895792 A2 | 3/2008 |
| EP | 1942695 A1 | 7/2008 |
| EP | 1944992 A1 | 7/2008 |
| EP | 2139180 A1 | 12/2009 |
| EP | 2139217 A1 | 12/2009 |
| EP | 2355012 A1 | 8/2011 |
| EP | 2547130 a1 | 1/2013 |
| EP | 2555547 a1 | 2/2013 |
| EP | 2601771 B1 | 6/2013 |
| EP | 2747466 A1 | 6/2014 |
| ES | 2282268 T3 | 10/2007 |
| FR | 2790161 A1 | 8/2000 |
| FR | 2911239 A1 | 7/2008 |
| FR | 2923128 A1 | 5/2009 |
| GB | 2414820 A | 12/2005 |
| GB | 2420937 A | 6/2006 |
| GB | 2473753 A | 9/2010 |
| GB | 2473753 A | 3/2011 |
| GB | 2473952 A | 3/2011 |
| GB | 2491392 A | 6/2011 |
| GB | 2491392 A | 12/2012 |
| IL | 159681 B | 6/2010 |
| JP | 2002511223 A | 4/2002 |
| JP | 2002537738 A | 11/2002 |
| JP | 2004503317 A | 2/2004 |
| JP | 2004535746 A | 11/2004 |
| NZ | 530498 A | 1/2005 |
| PT | 1407629 E | 4/2004 |
| WO | WO92/19078 | 10/1992 |
| WO | WO99/551007 | 10/1999 |
| WO | WO00/01179 | 1/2000 |

(56) References Cited

FOREIGN PATENT DOCUMENTS

| | | |
|---|---|---|
| WO | WO00/49820 A1 | 8/2000 |
| WO | WO0115478 A1 | 3/2001 |
| WO | WO0124494 A1 | 4/2001 |
| WO | WO0145446 A1 | 6/2001 |
| WO | WO0221872 A1 | 3/2002 |
| WO | WO02/28133 A1 | 4/2002 |
| WO | WO0239776 A1 | 5/2002 |
| WO | WO0249373 A2 | 6/2002 |
| WO | WO02057869 A2 | 7/2002 |
| WO | WO02-067563 | 8/2002 |
| WO | WO02067563 A1 | 8/2002 |
| WO | WO2003009623 A1 | 1/2003 |
| WO | WO03046742 A1 | 6/2003 |
| WO | WO03055249 A1 | 7/2003 |
| WO | WO03100646 A1 | 12/2003 |
| WO | WO2004030386 A1 | 4/2004 |
| WO | WO2004047480 A1 | 6/2004 |
| WO | WO2005018245 A2 | 2/2005 |
| WO | WO2005109947 A1 | 11/2005 |
| WO | WO2006002951 A1 | 1/2006 |
| WO | WO2006087720 A1 | 8/2006 |
| WO | WO20060087720 A1 | 8/2006 |
| WO | WO2006118742 A2 | 11/2006 |
| WO | WO2007102003 A1 | 9/2007 |
| WO | WO2007133139 A1 | 11/2007 |
| WO | WO2008087428 A1 | 7/2008 |
| WO | WO2009102245 A1 | 8/2009 |
| WO | WO200913341 A2 | 11/2009 |
| WO | WO2011036484 A2 | 3/2011 |
| WO | WO2011/153785 A1 | 12/2011 |
| WO | WO2012017059 | 2/2012 |
| WO | WO2012164287 | 12/2012 |
| WO | WO2012178055 A1 | 12/2012 |
| WO | WO2013007375 A1 | 1/2013 |
| WO | WO2013045606 A1 | 4/2013 |
| WO | WO2013124358 A1 | 8/2013 |
| WO | WO2014005324 A1 | 1/2014 |

OTHER PUBLICATIONS

GSM, 3rd Generation Partnership Project; Technical Specification Group Services and System Aspects; Feasability Study on Remote Management of USIM Application on M2M Equipment Release 8.
Apple's new multiple-MNO SIM.
Cubic Telecom Anouncement.
GSMA Embedded SIM Specification Remote SIM Provisioning for M2M.
ESEYE AnyNet™ SIMs Announcement.
AnyNet™ Multi IMSI Explained by Eseye.
Eseye Announcement—Eseye marks the world's first large scale deployment of true Multi IMSI SIMs with Gilbarco Veeder-Root deal.
Exclusive Sharing & Virtualization of the Cellular Network Timothy K. Forde, Irene Macaluso & Linda E. Doyle CTVR/ The Telecommunications Research Centre, University of Dublin, Trinity College, Ireland.
Genband, S3™ Session Border Controller on the Genband Genius™ platform.
Interoute launches new mobile roaming service by DeHavilland staff, for Total Telecom Tuesday Jun. 3, 2003.
LinqUs Instant Roaming Multi-IMSI by Gemalto.
LinqUs Multi IMSI Optimizer.
LycaMobile's Multi-IMSI Travel MVNO 'Toggle Mobile'.
Global "Multi-IMSI" M2M Solution Take control of your M2M SIM solution by Pod system.
Oasis SIM, associating with Marathon Telecom.
GSM Association: Remote Provisioning Architecture for Embedded UICC Technical Specification Version 2.0 Oct. 13, 2014.
GSM Association: GSMA SAS Standard for Subscription Manager Roles Version 1.0 Oct. 13, 2014.
GSM Association: SAS Methodology for Subscription Manager Roles Version 1.0 Oct. 13, 2014.
GSM Association: Remote Provisioning Architecture for Embedded UICC Test Specification Version 1.0.
TDF: develops Mobile Network Aggregator Service.
Teleena; Global Mobile Data Services 2014.
Telecom North America launches the multi-IMSI roaming hub.

* cited by examiner

MANAGING MOBILE DEVICE IDENTITIES

FIELD OF THE INVENTION

The invention relates to telecommunications, and specifically to the management of identity in mobile devices attaching to telecommunications networks.

BACKGROUND TO THE INVENTION

A primary customer identity is usually a unique human being but can be a machine, or sometimes a company entity such as a department. On a telecommunications network itself, identity is represented by one or more identifiers recognised by elements of, or attached to, the network. In the context of mobile telecommunications, such identifiers are commonly the customers IMSI (International Mobile Subscriber Identity) that resides on a SIM (Subscriber Identity Module), a telephone number MSISDN (Mobile Subscriber Integrated Services Digital Network Number), or other important identities such as MAC (Media Access Control) address, IP address, email address and IMEI (International Mobile Equipment Identity).

In the GSM (Global System for Mobile communication) authentication is performed using a SIM inserted into the mobile communications device. This manages the connection to the network as well as the user identity and the network subscriber keys. There are two types of network service—home service and roaming service.

'Roaming' refers to extending the connectivity of a service to a location that is different from a home location. When a mobile communications device, such as a mobile telephone, travels with a user outside of their home operator coverage area—'territory'—the device can still access services using roaming mechanisms/services. However, there are a growing number of people who live in more than one home and, of course, machines such as airplanes and cars don't have a 'home' in the human sense of the word. Such users are poorly served by current systems.

Another problem travelers experience as they travel near country or region borders is that mobile phones may inadvertently attach to a foreign network, even though they may be physically in a home territory. Under normal operation, once a handset (i.e. a mobile phone) is attached to a network, it remains attached to it until signal is lost or if the subscriber manually disconnects. As a result, the user is charged high roaming charges for an extended period even if though they were physically in their home territory. In some regions such as Canada, USA and India where there is national roaming this effect can lead to accidentally high bills even when the customer is not travelling at all.

There are few options available to users when travelling which help reduce these surcharges:—

One option for a user is to purchase a plurality of additional pre-pay subscriber identification modules (SIMs), one for each territory which the user visits. A SIM is a plastic card with embedded electronic circuitry, which has a unique serial number and an international number for the mobile user (IMSI). The SIM enables communication between the mobile device and available cellular networks. Therefore, by purchasing a plurality of different SIMs, —one for each territory—the user is able to replace the original SIM with an appropriate SIM for the territory being visited. In this way, the mobile device appears to be a subscriber of the foreign network, which means the user can make and receive calls or use data services without incurring roaming surcharges.

This option has many disadvantages:
- the user must purchase and carry around a plurality of different SIM cards;
- the user must ensure that there is sufficient credit in the accounts linked with each SIM card. Furthermore, it is not desirable to have unused credit on a number of different networks, as this credit may be wasted without being redeemed;
- The act of maintaining a plurality of different SIM accounts is cumbersome and time consuming, involving considerable user interaction;
- When the Subscriber swaps SIM their mobile number changes this means they are no longer reachable on their normally used number. Further if they make an outbound call their Caller Line Identifier (CLI) will be a new one and therefore unknown to the receiver. This may result in the called party refusing to answer that call as they do not recognise the caller.
- Law enforcement agencies are frustrated in their endeavours to keep track of undesirable people as they effectively have to keep track of multiple copies of the same person.

There are attempts in the prior art to address at least some of these problems.

WO2006/002951 (Brunnekreef) relates to an approach in which the user (or an application) on the mobile phone can pre-pend a (sometimes hidden) telephone number of an intermediate service that will accept the user's call, remove the pre-pended information and call the desired destination number. The caller then drops the call automatically and awaits a call-back. The intermediate service calls the user back to complete the connection, and this may give the user better calling rates than normal roaming surcharges. This has the disadvantage of introducing a delay in the communication channel while the user is trying to contact another party. Furthermore, the user gets a very poor user experience due to handset software compatibility issues: depending on the model of the mobile phone, the phone may appear to 'do nothing' until it gets the call back, strange messages such as 'call failed' or 'call blocked' may appear or the service may not work at all.

Another prior art approach is to have a mechanical device that includes a flexible strip (often called a slim SIM). This device physically connects multiple SIMs to a handset, and can be used with a means of switching between the SIMs. This device requires there to be some spare space within the handset to store the additional SIMs, and this solution is problematic to implement if the SIMs are not compatible with each other (e.g. use different data speeds or voltages). Alternately the Images of all but one SIM can be cloned onto the SlimSIM chip and a remaining SIM used—a one plus many clones solution. Again the physical form factor is incompatible with many handsets and the cloning of SIMs is unlawful in many countries and breaks contracts in almost all cases.

Multi-IMSI SIMs are available that offer the capability of being pre-programmed with a plurality of mobile subscriber data sets. The data sets are sometimes incorrectly referred to as IMSIs, hence the name 'multi-IMSI SIM', but are actually data sets which each comprise an international mobile subscriber identity (IMSI) and other network-related data. These SIMS have processing capability and an algorithm to present the correct set of data to the phone based on the location of that phone. This allows the phone to present as a 'local' subscriber to the network in question.

Many fixed format Dual and Multiple IMSI SIM systems have been sold by companies such a as VeriSign, Gemalto and these are described in various patent applications such as Cammileri (WO2007102003), Stadelmann (WO9955107), Salomon (WO0221872), Bongers (WO0049820). In such systems, a piece of software runs in the SIM or on the handset or a separate electronic module and makes decisions as to which IMSI to use given the location and available networks. Such systems are sometimes called SmartSIMs, but in fact this is a misnomer as all SIMs are smart and contain a microprocessor and memory to run network selection and authentication programs.

Such systems are however typically relatively inflexible to changes in network availability over time and require informed decision making from users. This can result in failures of operation and poor network choices.

An improved system is disclosed in the applicant's earlier WO 2011/036484. This discloses a system in which a central service—an "IMSI Broker"—is adapted to provision the SIM of a mobile handset with new identities as required. While this approach addresses certain problems of the prior art, it does not in itself solve the problem of making reliable and effective choices of identity at the mobile handset.

SUMMARY OF INVENTION

In a first aspect, the invention provides a method of managing identities for use in a mobile telecommunications device in a telecommunications network, the method comprising: triggering an identity management process; detecting one or more parameters associated with the mobile telecommunications device; in the identity management process, selecting an identity management rule determined by the one or more parameters detected; in the identity management process, searching an identity database wherein each record comprises an identity and additional identity information for each identity, wherein the searching prioritises records according to the identity management rule; in the identity management process, selecting an identity when a record conforming to the identity management rule is found in said searching; and in the identity management process, modifying an active identity of the mobile telecommunications device to be the selected identity when the active identity is not already the selected identity.

This method is particularly effective as the present inventors have determined that parameters associated with the mobile telecommunications device itself, rather than just those relating to location, may be particularly important to identity choice. This is because it is found that some identities (because, for example, of the properties or method of operation of associated telecommunications networks) are particularly effective or less prone to problems than others for particular mobile telecommunications devices.

Preferably each said identity comprises an IMSI.

The one or more parameters comprise a handset type. This may be as determined from the TAC code in the IMEI of the handset. The one or more parameters may also comprise a subscription type associated with the device, wherein the subscription type relates to one or more of a device operating system and a communication type. These parameters allow for an effective choice of identity to avoid difficulties which may occur with particular combinations of mobile communications device and network.

The additional information may comprise an MCC and an MNC for each identity. If so, it is advantageous for the identity management rule to allow for selection of an identity based on matching of some or all of an MCC or an MNC value. If there is no match established by the identity management rule to a specific identity, a new identity may be selected from a pool of matching identities.

Advantageously, a process of modifying the active identity is determined according to the one or more parameters of the device. This allows modification of the active identity to be carried out effectively in accordance with the capabilities of the device itself.

Advantageously, if on modifying the active identity no service is provided to the new active identity, the active identity is modified to a backup identity different from the identity for which no service was provided. This ensures that the device is not fixed with an identity which is theoretically the best, but which has in practice a service problem—with this approach, service will still result even if the initial identity choice is ineffective.

In a further aspect, the invention provides a subscriber identity module for use in a mobile telecommunications device and having a plurality of identities for use in a mobile telecommunications network, the subscriber identity module comprising a memory and a processor, wherein the memory comprises an identity management process for execution by the processor and an identity database, wherein the processor is adapted to: on triggering, initiate the identity management process; detect one or more parameters associated with the mobile telecommunications device; in the identity management process, selecting an identity management rule determined by the one or more parameters detected; in the identity management process, search an identity database wherein each record comprises an identity and additional identity information for each identity, wherein the searching prioritises records according to the identity management rule; in the identity management process, select an identity when a record conforming to the identity management rule is found in said searching; and in the identity management process, modify an active identity of the mobile telecommunications device to be the selected identity when the active identity is not already the selected identity.

BRIEF DESCRIPTION OF DRAWINGS

Specific embodiments of the invention will be described below, by way of example, with reference to the accompanying drawings, of which.

DETAILED DESCRIPTION OF PREFERRED EMBODIMENTS

Figure 1:
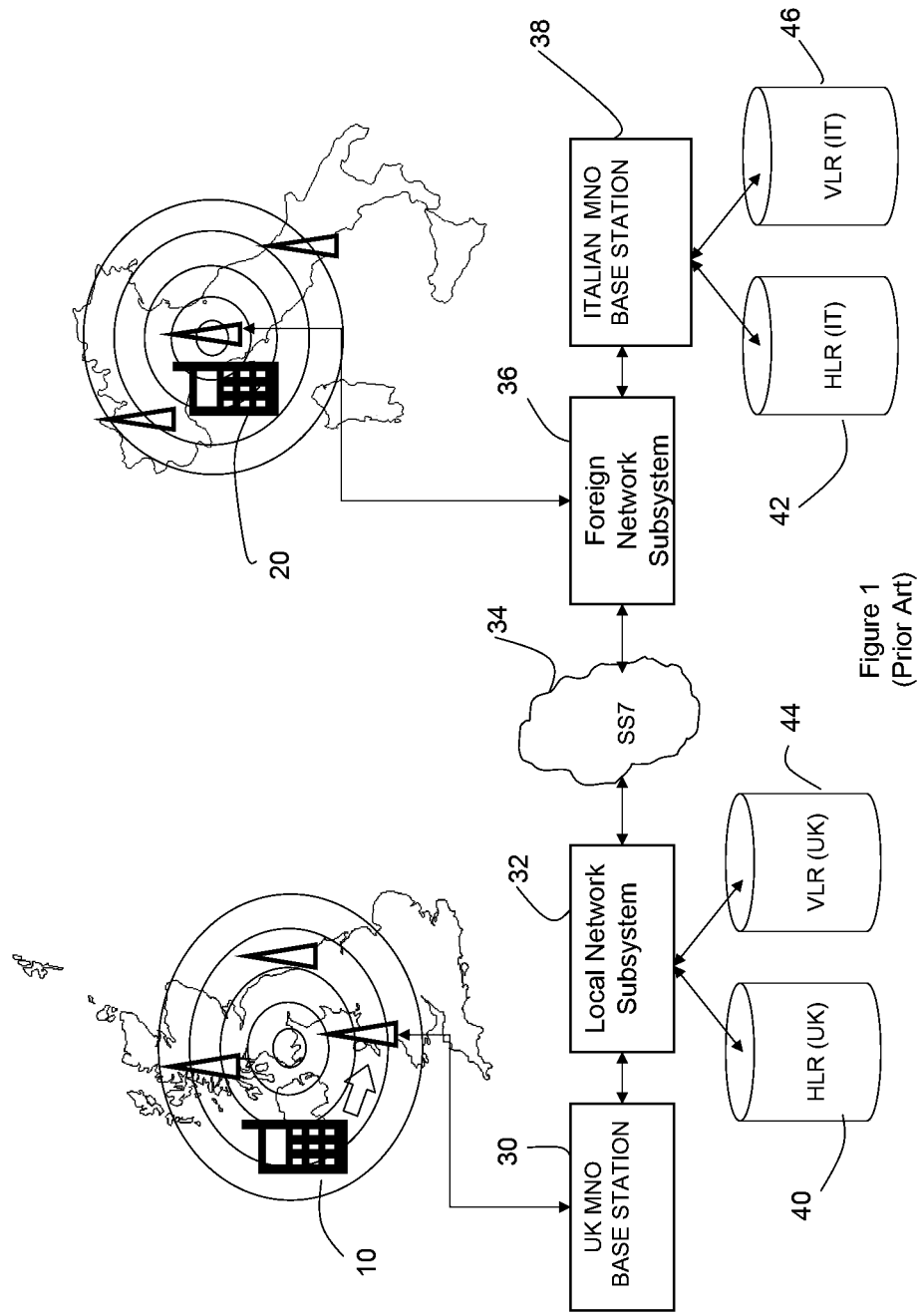
FIG. 1 is an overview of a conventional communications system in which aspects of the present invention can operate.

FIG. 1 provides a schematic representation of two cellular telecommunications networks, one in the UK and one in Italy, to indicate the general roaming problem addressed by embodiments of the invention. In reality there are many more Mobile Network Operators (MNO), Mobile Virtual Network Operators (MVNO) or Mobile Virtual Network Enablers (MVNE), and as such many more cellular telecommunications networks. However, FIG. 1 represents only two networks for simplicity.

When a first user makes a call from a first mobile phone 10 in the first user's local network, for example, in the UK, to a second user 20 in a foreign network (i.e. Italy), the call is routed through the local network's base station subsystem (BSS) 30 to a local network switching subsystem (local-NSS) 32, the call is then routed through the Signaling System Number 7 (SS7) 34 network to the foreign network, and through a foreign network switching subsystem (foreign-NSS) 36 to the foreign network's base station subsystem 38. The call is finally routed to the second user's mobile phone 20. Calls in the opposite direction are routed in the same way, through the foreign network's base station subsystem, to the foreign network switching subsystem 36, through SS7 34 to the local network switching subsystem (local-NSS) 32, on to the local network's base station subsystem (BSS) 30, and finally to the first mobile phone 10.

The way that the call is routed to the correct recipient is through a plurality of location registers which form part of the network subsystems. For every user registered in a particular cellular telecommunications network, there is a record held in that network's Home Location Register (HLR) 40, 42. The HLR 40,42 is a central database that contains details of each mobile phone subscriber that is authorized to use that particular network.

The HLR stores details of every Subscriber Identity Module (SIM) card issued by the mobile phone operator (i.e. MNO, MVNO or MVNE). A SIM is a plastic card with embedded electronic circuitry, which is inserted into the mobile phone. Each SIM has a unique identifier called an International Mobile Subscriber Identity (IMSI) which is a primary key to each HLR record. IMSIs are used in any mobile network that interconnects with other networks, including CDMA and EVDO networks as well as GSM networks.

An IMSI is usually 15 digits long, but there are some exceptions. Typically the first 3 digits are the Mobile Country Code (MCC), followed by the Mobile Network Code (MNC), (either 2 digits (European standard) or 3 digits (North American standard)). The remaining digits contain a mobile station identification number (MSIN) within the network's customer base.

SIMs also comprise one or more MSISDNs, which are the telephone numbers used by mobile phones to make and receive calls. Each MSISDN is also a primary key to the HLR record.

In summary, there is a relationship between the HLR, MSISDN, IMSI, and the SIM. The SIM is the physical device which contains a record of the IMSI. The MSISDN is the unique number identifying the mobile phone. The IMSI is the unique identifier of the user subscribing to the network, and the HLR is the system that maps MSISDNs to IMSIs and vice versa.

The above holds true when a user 'roams' away from their home/local network to a foreign network also called a roamed-to network. However, when a mobile phone attempts to connect to a network which is not the home/local network, the roamed-to network communications with the home network in order to verify whether the mobile phone is authorised to use the roamed-to network. This communication is possible because there are reciprocal agreements between many of the available network operators.

When a user roams away from their home service and into an area served by another operator, messages are exchanged over the SS7 network and the roamed-to network operator obtains information from the home network's HLR and creates a temporary record for the subscriber in its Visitor Location Register (VLR) 44, 46. The VLR is a database which is maintained by a network operator (in the same way as the HLR is maintained). However, the VLR of the Mobile Switching Center (MSC) contains temporary information about mobile users that are currently located within the service area of that MSC. When calls are made from the mobile phone, the VLR is checked for authorisation, and assuming authorisation is permitted, the Mobile Switching Center (MSC) permits tracking of the use of the mobile phone for billing purposes. The HLR subscriber profile (i.e. which services are allowed) is downloaded to the VLR when subscribed user registers on (connects to) the network (same for roaming and home network). All call handling and billing related call data record (CDR) generation is done by the MSC—the HLR is not involved.

So using the example in FIG. 1, a user subscribed to a mobile network operator in the UK visits Italy. When the user arrives in Italy and turns on the mobile phone, the mobile phone will try to connect to an available Italian network operator 36. The Italian network operator can identify from the IMSI number stored in the SIM card that the user is not subscribed to the Italian network, and as such, will contact the user's home network 32 in the UK to verify whether the user is authorised to use the Italian network.

The VLR 46 updates the HLR 40 in the UK, with location information over SS7 with a Location Update message (LU). The LU message is routed to the HLR(UK) based on the global title translation of the IMSI that is contained in a Signalling Connection Control Part (SCCP) field of the LU. The HLR(UK) informs the VLR(IT) as to the status of the subscriber and whether service is to be provided in the roamed-to network, i.e. the Italian network. If the user is authorised, the Italian network generates a temporary record for the user in the Italian VLR 46.

As described above, there are problems associated with roaming services in that users connected to a roamed-to network incur heavy surcharges when making or receiving calls or using data services on their mobile phones. This is true regardless of where the user is calling, or who is calling the user. In the above example, the user visiting Italy will incur roaming charges when calling local Italian phone numbers as well as calling phones in the home network in the UK and elsewhere. Similarly, roaming charges will be applied to incoming calls from either UK, Italian or other phone numbers.

The prior art methods for reducing these roaming charges are cumbersome as they require the user to purchase, carry around, and maintain the accounts of, many different SIM cards, or they require a high degree of user interaction in order to utilise one of the services to circumvent these roaming charges. However, as described above there are many known problems with these services.

As described above, WO 2011/036484, the disclosure of which is incorporated by reference herein to the extent permitted by law, provides an additional central server within a typical cellular telecommunications network. The additional central server is able to provide, as required, a plurality of additional IMSIs to a mobile phone, when the mobile phone is connected to a roamed-to network in another country/region. The additional central server is referred to as an IMSI Broker. In such a system, the IMSI Broker is arranged to determine whether the SIM card in the mobile phone has an appropriate IMSI for the roamed-to network. The SIM cards required for this embodiment of the invention are capable of storing a plurality of alternative IMSIs for different networks, together with associated rules governing when the alternative IMSIs should be used. In this embodiment, the IMSI broker has access to a database store of alternative (new) IMSIs for multiple foreign networks (FNOs) and is arranged to distribute these new IMSIs as necessary to users who are subscribed to a network comprising an IMSI broker and, who are roaming across networks.

In this arrangement, each SIM has the capability of storing a plurality of IMSIs that can be used in a specific territory (country or region) to achieve the best possible calling rates. The SIM also has a set of rules to drive the selection of the best possible IMSI. Every time a user enters a different territory (mostly a new country, but it could also be a new region within a country), the IMSI Broker will issue the best possible IMSI and IMSI selection rules for that territory. The IMSI Broker will send this new IMSI to the SIM via Over The Air (OTA). This solution eliminates the need to swap out SIMs when new wholesale network deals become available. Subscribers are issued an additional IMSI when and where available.

Updates and management of the data in the SIM can be achieved over the air interface using any available OTA radio connection. Some examples, include but are not limited to, cellular signalling channels, cellular data connections, text messaging, WiFi, Bluetooth & WiMAX. A person skilled in the art will appreciate that 'OTA' shall include all possible connections to the mobile handset and any other method of transferring data to the handset device such as wired connection to a PC, Infra-Red and so on.

Using this approach, the SIM may, at the time of manufacture, be programmed to include a plurality of IMSIs corresponding to popular destinations. In another embodiment, the SIM may be programmed with a plurality of IMSIs at registration with the network, in accordance with user selection of countries or territories to which the user expects to visit in the future. In another embodiment, the SIM may only comprise one IMSI after manufacture and registration, such that all of the new/alternative IMSIs are delivered from the IMSI Broker as and when the user visits new countries/territories.

SIMs are evolving continuously, and currently known SIMs may be capable of storing up to 256 different IMSIs in the SIM's memory. This number is likely to increase further. However, regardless of the number of IMSIs that the SIM is able to hold, other memory constraints may mean that an upper limit is placed on the number of IMSIs to be stored within the SIM. In cases where an upper limit is reached, according to one embodiment of the present invention, the SIM is able to dynamically overwrite a stored IMSI with a newly obtained IMSI. The decision as to which IMSI is overwritten can be based on a number of factors, for example, any unused IMSI may be the first to be overwritten. Likewise IMSIs that have been used the least, or which have been used less frequently may be overwritten before more popular/recently used IMSIs.

While embodiments of the present invention may be used effectively with the IMSI Broker described here, and in more detail in WO 2011/036484, the IMSI Broker is not itself an aspect or feature of the present invention, which is directed to management of identity at a mobile device.

Figure 2:
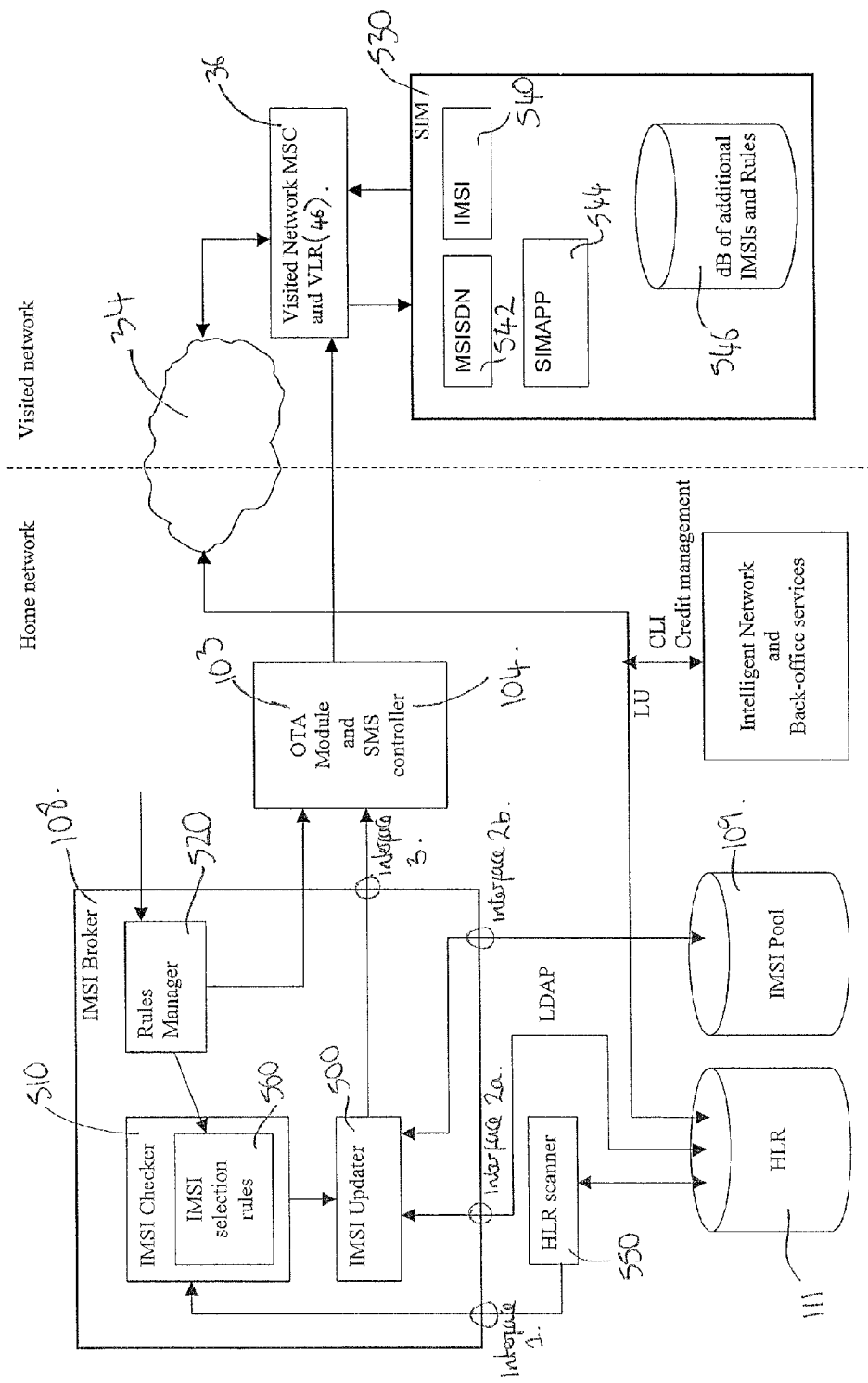
FIG. 2 is a functional block diagram of a system in which identities may be provided by a central service, and also show the elements of a SIM in accordance with embodiments of the invention.

FIG. 2 shows a schematic overview of an integrated IMSI Broker 108 and a handset SIM 530 in communication with it over a network. In this sense, network need not be limited to the physical network which is operated by a single network operator. In other words, the term network may be taken to mean a collection of co-existing networks.

The MSC of a network communicates with the HLR 111, which in turn communicates with the IMSI Broker 108 and an Intelligent Network (IN)/Back-office Services system (BSS) module 113. The IN/BSS module has access to a user dB which comprises a record for each user subscribed to the network. The IN/BSS module 113 is responsible for monitoring the user's usage, i.e. voice calls, SMSs, data usage etc, such that a record is kept for billing purposes. In one embodiment, the IN module 113 is also responsible for ensuring that caller ID information, also known as Caller Line Identification (CLI), is stored and provided during calls while roaming, to ensure that there is transparency for the called parties.

The IMSI Broker 108 has access to an IMSI Pool 109, which is a database comprising a plurality of available IMSIs for different territories/locations. IMSIs by their nature are territory specific. They are both country specific, and may also be region specific in countries (i.e. USA, India) where there may be surcharges for regional roaming as well as international roaming. An IMSI which is registered on an HLR in one territory will be deemed to be roaming if connected to a network/HLR in a different territory. Therefore, for each territory in the IMSI Pool 109 there is a sub-pool or range of suitable IMSIs which may be used. This is described in more detail later.

The IMSI Broker 108 comprises an IMSI updater 500, and IMSI checker 510, and a rules manager 520.

The network also comprises an OTA module which is arranged to send update messages to mobile phones as necessary. The update messages may include alternative IMSIs and/or rule update messages. This updating mechanism is not limited to provision of alternative IMSIs or associated rules—it may also be used to provide other updates to the SIM card (such as new versions of installed software) and also for verification of settings.

The HLR is further arranged to communicate with a plurality of foreign networks (operated by foreign network operators FNOs). The communication channel between the HLR and foreign networks is through the SS7 network.

FIG. 2 also comprises a schematic block diagram of the functional components within the SIM 530. As shown the SIM comprises a current IMSI 540, a current MSISDN 542, a SIM application (SIMAPP) 544 for executing functional steps on the SIM, and a database 546 of available IMSIs, associated rules, and MSISDNs.

The skilled person will review WO 2011/036484 for further details of the IMSI Broker system, as required. Embodiments of the present invention will now be described with reference to a SIM of the type illustrated in FIG. 2—as indicated above, such a SIM may or may not be used in connection with an IMSI Broker system as indicated here, or may be used independently of such a system (or with a different type of system for providing user identities where required).

In one aspect, aspects of the invention involve a method of managing identities for use in a mobile telecommunications device in a telecommunications network, the method comprising:

triggering an identity management process;

detecting one or more parameters associated with the mobile telecommunications device;

in the identity management process, selecting an identity management rule determined by the one or more parameters detected;

in the identity management process, searching an identity database wherein each record comprises an identity and additional identity information for each identity, wherein the searching prioritises records according to the identity management rule;

in the identity management process, selecting an identity when a record conforming to the identity management rule is found in said searching; and in the identity management process, modifying an active identity of the mobile telecommunications device to be the selected identity when the active identity is not already the selected identity.

This approach can be used on different types of telecommunications network, but is effective on a GSM network, or on a 3G or LTE network as specified by 3GPP. The SIM may be a conventional SIM, or may be a USIM running on a smart card running on a 3G phone—the term "SIM" will be used hereafter for all types of SIM, whether embodied as a SIM card, an application on a smart card, or a routine instantiated virtually. Advantageously, such a SIM is designed and implemented according to currently applicable standards (at the present time, such standards include ETSI TS151.011, ETSI TS131 101, ETSI TS102 221, ETSI TS131 102, ETSI TS131 111 and ETSI TS151 014). An effective approach for implementing the method to be described is a USIM and SIM combination in which the SIM and USIM (hereafter called (U)SIM) are designed and implemented as per ETSI TS151.011, ETSI TS131 101, ETSI TS102 221, ETSI TS131 102, ETSI TS131 111 and ETSI TS151 014. Additionally, an application and additional files are added to the (U)SIM that implement the method.

Figure 3:
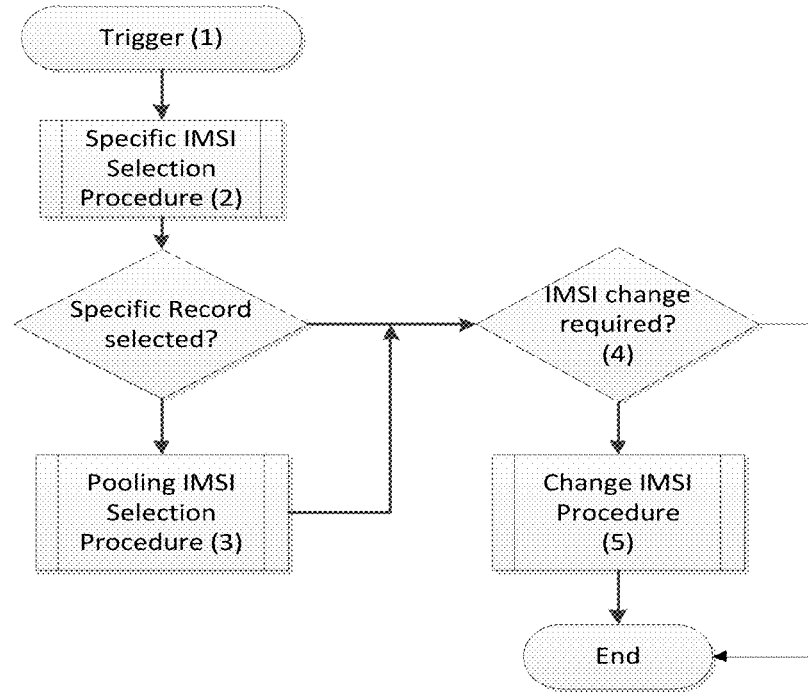
FIG. 3 shows elements of an identity management process in accordance with one aspect of the invention.

As shown in FIG. 3, there are a series of main stages are present in a process operated according to an embodiment of the invention. These are a trigger step 1, an identity selection step 2, a pooling identity selection step 3, and an identity swap step 4, 5. The identity selected and swapped is in this case an IMSI—the approach shown here may however be applied to the selection and swapping of other identity types. Also described below, though not shown in FIG. 3, is a mechanism for making status queries.

Figure 4:
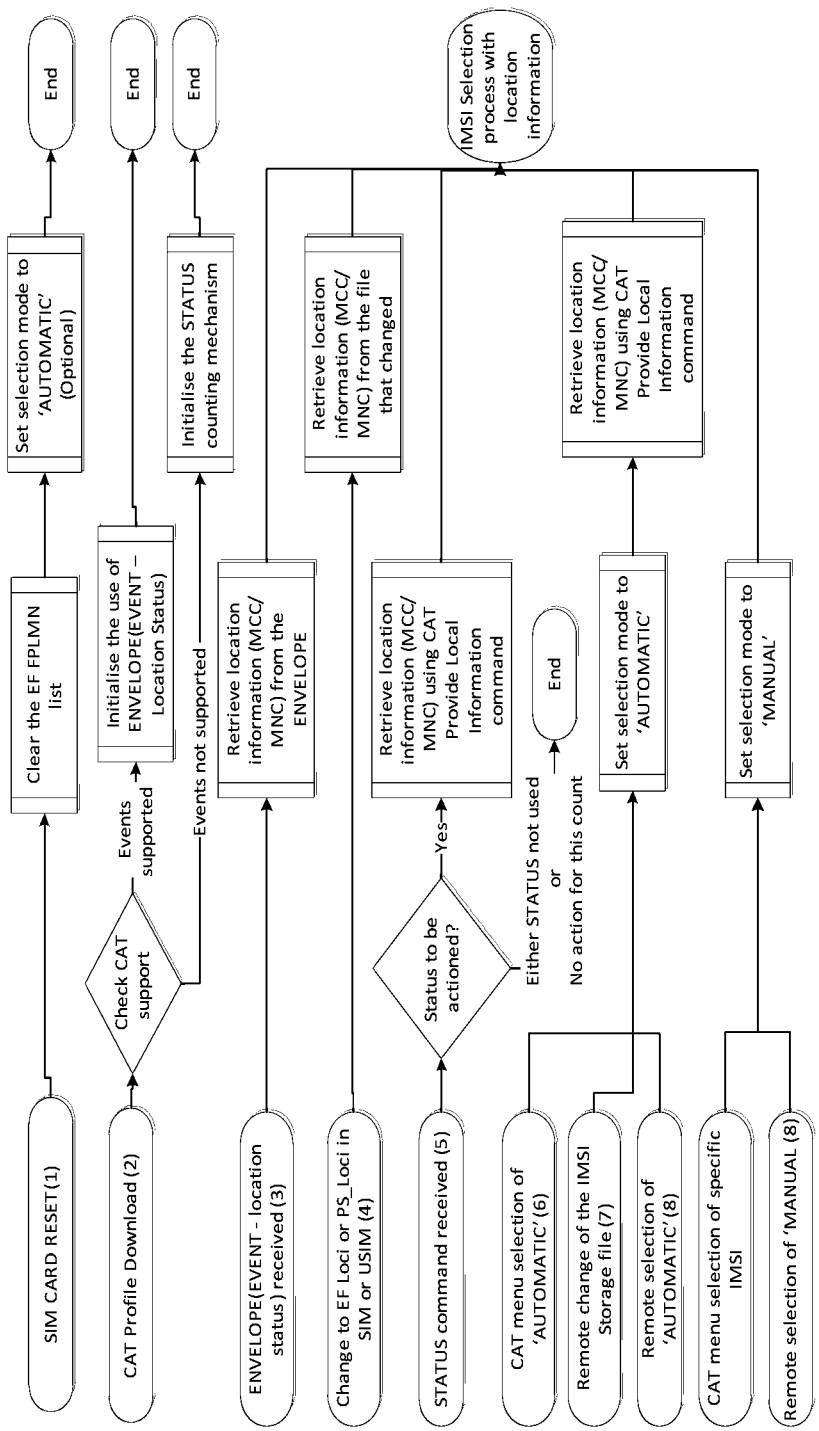
FIG. 4 illustrates different possible trigger steps in the process of FIG. 3, and their consequences.

FIG. 4 illustrates different possible trigger steps and their consequences. In embodiments, any of the following events can trigger further operation of the application:

The (U)SIM coming out of RESET
A SIM or card application toolkit profile download received by the (U)SIM.
A SIM or card application toolkit EVENT(Location Status)
A change to the contents of any specific UICC file.
A STATUS command is received by the (U)SIM.
A specific plugin is called in the WIB environment.
By a specific message over a Java shareable interface.
A change to the IMSI storage file used by the application by a message from a remote service (IMSI Broker).
An instruction to change IMSI to a specific IMSI from a remote service (IMSI Broker).
An instruction to change the IMSI selection mode to 'AUTOMATIC' from a remote service.

If the trigger is the (U)SIM coming out of RESET then the application shall initialise itself. As part of this initialisation the SIM may either remove all networks from the forbidden list (defined in ETSI TS151 011 and ETSI TS102 221) or remove just the preferred network for the current known location before the handset reads this file. Optionally if the IMSI selection mode is set to 'MANUAL' then the IMSI selection mode may be changed to 'AUTOMATIC'.

If the trigger is the (U) SIM receiving a SIM or card application toolkit profile download then the application shall analyse the contents of the profile download to determine the level of support the handset has for different aspects of the application function. If the handset supports the SIM or Card application toolkit EVENT(Location Status) then it shall use incoming events to automatically trigger IMSI changes, and otherwise it shall monitor changes in the (U)SIM files and STATUS commands to trigger IMSI changes. OTA triggers and triggers from other applications on the card (such as the WIB or Java applications) shall always be available regardless of the TERMINAL PROFILE.

If the trigger is a SIM or card application toolkit EVENT (Location Status) then the application shall use the PROVIDE LOCAL INFORMATION (cell id) to determine the network connection status and the MCC and MNC of the current network (if available) and then follow the IMSI selection procedure.

If the trigger is a change to any specific file being monitored for this purpose then following the file change the application shall use the PROVIDE LOCAL INFORMATION (cell id) to determine the network connection status and the MCC and MNC of the current network (if available) and then shall follow the IMSI selection procedure.

If the trigger is a STATUS command is received by the (U)SIM then the application shall decide whether this STATUS command shall be used as a trigger. This may be decided based on the number of STATUS commands received or by some other means. If triggered by the STATUS command, the application shall use the PROVIDE LOCAL INFORMATION (cell id) to determine the network connection status and the MCC and MNC of the current network (if available). It will then follow the IMSI selection procedure.

If the trigger is a change to the IMSI storage file used by the application or due to a WIB plugin call with the trigger type set to automatic, or due to a communication with a Java application over a shareable interface where the selection mode is set to automatic, or a message from a remote service (IMSI Broker) to go into 'AUTOMATIC' mode, then the application shall use the PROVIDE LOCAL INFORMATION (cell id) to determine the network connection status and the MCC and MNC of the current network (if available). It will set the IMSI selection mode to 'AUTOMATIC' and then follow the IMSI selection procedure.

If the trigger is the selection of a specific IMSI either due to a WIB plugin call with the trigger type set to manual or due to a communication with a Java application over a shareable interface where the selection mode is set to manual or due a message from a remote service (IMSI Broker) then the IMSI selection mode shall be set to 'MANUAL' and the IMSI swap process shall be followed using the specified IMSI.

The IMSI selection procedure will now be described. The procedure described below in detail is the automatic process, but there is also an option to bypass the automatic process by allowing manual selection.

Figure 5:
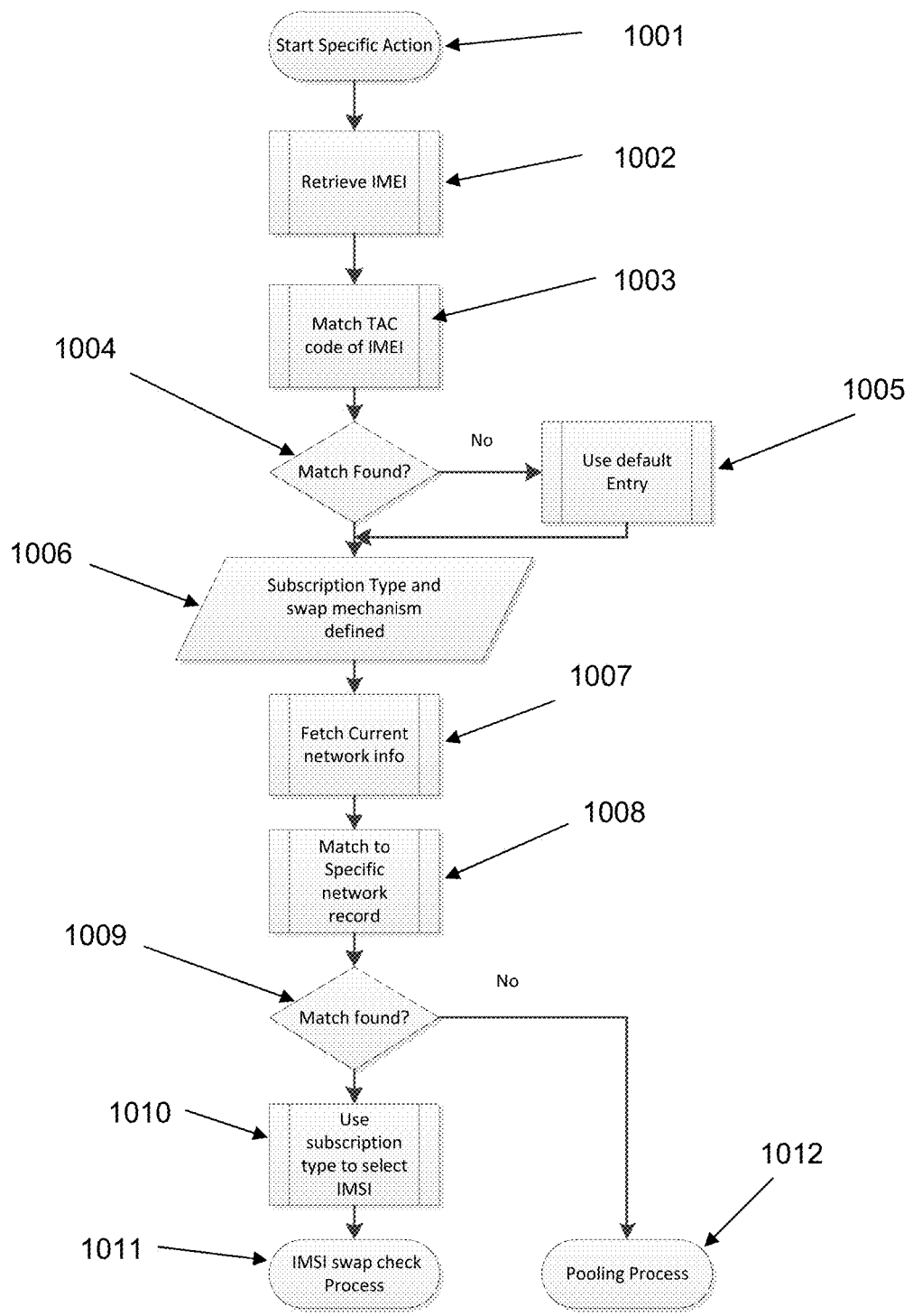
FIG. 5 illustrates an IMSI selection procedure for use in the process of FIG. 3.

The automatic IMSI selection process is a 2 step procedure:

Step 1 (shown in FIG. 5)—Selection of an IMSI based on a specific action based on the type of handset and network detected Step 2 (shown in FIG. 6)—Selection of an IMSI based on a set criteria from a pool of IMSIs available for this purpose (pooling). This selection is not based on the current network.

On entry to the IMSI selection procedure, if the IMSI selection mode is set to manual then the method ends with no change.

If the IMSI selection mode is set to automatic then the handset IMEI is detected, the subscription type is read from the SIM and the MCC and MNC is retrieved from the result of a PROVIDE LOCAL INFORMATION—Cell ID SIM toolkit Command. This process is described below in more detail with reference to FIG. 5. It comprises two main stages: determination of the subscription type, and determination of the IMSI to use based on subscription type and network code.

The process is started by a specific action (step 1001), for example as discussed above with regard to triggering steps. The IMEI (International Mobile Equipment Identity, providing a unique identity for each mobile device) for the device is then retrieved (step 1002), and the TAC code retrieved (the TAC or Type Allocation Code identifies the model and origin of the device and is provided as an 8-digit number forming part of the IMEI).

The TAC code is then matched to a record stored in the SIM (steps 1003 and 1004). This need not be an exact match—a wild card mechanism may be used to match only part of the TAC code. If a record is found (step 1006) then the actual subscription type to be used and the swap mechanism to be used is determined from that record by using the initial subscription type from the SIM. As discussed below, the swap mechanism is also made dependent on parameters of the device itself. If no specific IMEI TAC is matched (step 1005) then a record marked as a default entry may be used—the actual subscription type to be used and the swap mechanism to be used is then determined from that record by using the initial subscription type from the SIM. If no default entry exists for the IMEI matching then the subscription type is unmodified and the swap mechanism to be used shall be the default swap mechanism set by the method.

Like handset type, subscription type is also a property of the mobile device itself. In some cases, this will be determined by the operating system and processes of the device itself (for example, Apple and BlackBerry devices are differentiated in this way). It may also be determined by whether the device is operating according to a prepaid or a postpay protocol, or by whether the device is configured for voice, data, or a combination of the two.

Once the handset type and subscription type have been established, this is used for IMSI selection. Firstly, a currently active network is determined (step 1007) and an attempt is made to match the MCC/MNC combination of the current network to a record stored in the SIM (step 1008). As described previously for the IMEI/TAC, a wild card mechanism may be used to match only part of the MCC/MNC code.

If a record is found (step 1009) then the IMSI to be used (or a reference to that IMSI) is determined by using the IMSI assigned for the current subscription (step 1010). This will typically be a unique choice already determined for that description. After the selection, the IMSI swap process is initiated (step 1011) as is described further below. However, if no entry exists for the MCC/MNC code matching (step 1012) then a pooling mechanism is used to provide an appropriate IMSI. This is discussed with reference to FIG. 6.

Figure 6:
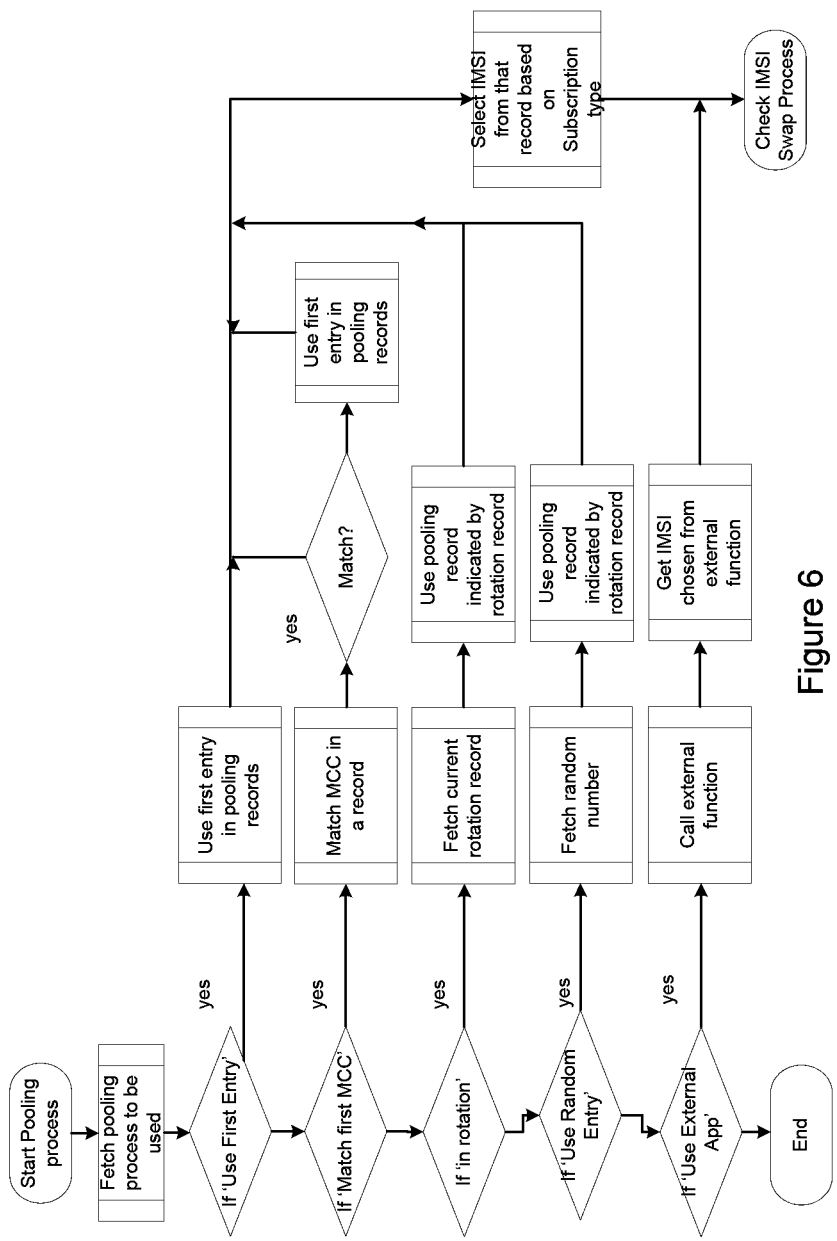
FIG. 6 illustrates a process for managing an IMSI pool for use in the IMSI selection procedure of FIG. 5.

The pooling process indicated in FIG. 6 relies on the handset type and subscription being known as discussed above—the handset type and subscription constrain the choices available in the pooling process to those which are suitable for that handset and subscription. The process is called if there is no match to a specific MCC/MNC.

There are many mechanisms specified for IMSI pooling and further methods can be added remotely over the air. The selection of the pooling mechanism to use may be stored on the SIM, or may be provided as an input to the process through the trigger.

In the embodiment described here, the following mechanisms may be supported:
  Use first entry—always use the IMSI based on the subscription type for the first entry in the pooling list.
  Match first occurrence of MCC—use the IMSI indicated based on the subscription type for the first pooling record that contains the current MCC else use first record.
  In rotation—use the IMSI indicated based on the subscription type for the next pooling record from the pooling record used prior to the last switch on.
  Random—use the IMSI indicated based on the subscription type for the randomly selected pooling record chosen at switch on.
  External application—one or more external application is called to make the IMSI selection.

The implementation of these choices and the resulting process is shown in FIG. 6.

If the new IMSI is different from the current IMSI then the IMSI swap process is followed.

If the new IMSI is the same as the current IMSI and if the current IMSI is not allowed to connect to the "allowed network" for that IMSI (this may be indicated as a "limited service" response to a PROVIDE LOCAL INFORMATION (Cell ID) command, a "limited service" indication in the EVENT(Location Status) or a "PLMN not allowed or Routing area not allowed" in any Loci file.) then the recover service process indicate below is followed.

If the SIM is in "network backup mode" the MCC indicated is the same as the previous MCC indicated then the recover service process is followed. However, if the SIM is in "network backup mode" the MCC indicated is different to the previous MCC indicated then the "network backup mode" is cleared.

The network recover service is used when the expected service is not available. This feature, which is an option which may be disabled without affecting the operation of other features of this embodiment, is used to try and deliver service to a user when the automatically chosen IMSI is forbidden on a network that the SIM expects service. The recover service process checks if a backup IMSI value indicated for the current record is the same as the current IMSI. If it is not the same, the IMSI will be changed using the IMSI change procedure. The SIM shall then set "network backup mode" as being in effect.

The manual selection process may be chosen as an alternative to the automatic process, and may be triggered, for example, by a WIB plugin, a java applet via the shareable interface or by an OTA update of the EF manual IMSI file.

Using this approach, If the IMSI value indicated manually is different to the current IMSI then the application checks the IMEI of the device and matches it to a record in EF IMEI_Specific_Info. The indicated IMSI swap mechanism for that IMEI (or the default record if there is no match) stored on the SIM is then used to change the IMSI.

Returning to FIG. 3, the Change IMSI process to allow IMSIs to be swapped is carried out as follows.

On entry into the IMSI swap procedure the application first checks whether the new IMSI to be selected is the same as the existing IMSI being used.

If it is the same, then the application exits without making any change to the IMSI and its associated parameters.

If it is different, then the Change IMSI procedure is actioned. This process is started if the SIM determines it needs to change IMSI. The IMSI swap process is based on the handset type and its associated entry in the record for that handset type.

The following processes may be supported, for example:
Refresh (type 6) with all change files notified
Refresh (type x) where x is passed to the routine
Display to user asking them to switch the phone off then on again
through a separate application 1
through a separate application 2

The particular process to be followed may be determined for a specific handset type chosen to be in accordance with the handset capabilities in order to ensure effective function.

The application uses the card application toolkit REFRESH command to reset the GSM/3G/LTE session and to inform the handset that the following files have changed. If the handset does not support this command an alternative approach will be taken, such as the application requesting that the user switches the handset off and on using the card application toolkit DISPLAY TEXT command. Alternatively, for particular handsets a different application entirely may be initiated.

When the UICC restarts, either due to the REFRESH or to whatever change process is used, in embodiments the application may change the following before the handset reads them:
EF IMSI in DF GSM and ADF USIM are set to the new IMSI.
EF SMSP is changed to the SMSC value relevant to the new IMSI (optional).
EF OPLMNwACT is changed to the correct content relevant to the new IMSI (optional).
The authentication parameters are set to the relevant values for the new IMSI(optional).
The EF LOCI and EF PS_LOCI in DF_GSM and ADF USIM are set to their initial provisioned value.

The modification of identity may include the modification of one or more of the following files in the SIM: EF LOCI, EF PS_LOCI, EF GPRS_LOCI, EF OPLMNwACT, EF PLMNwACT, EF HPLMNwACT, EF PLMNsel, EF FPLMN and EF HPPLMN.

Figure 7:
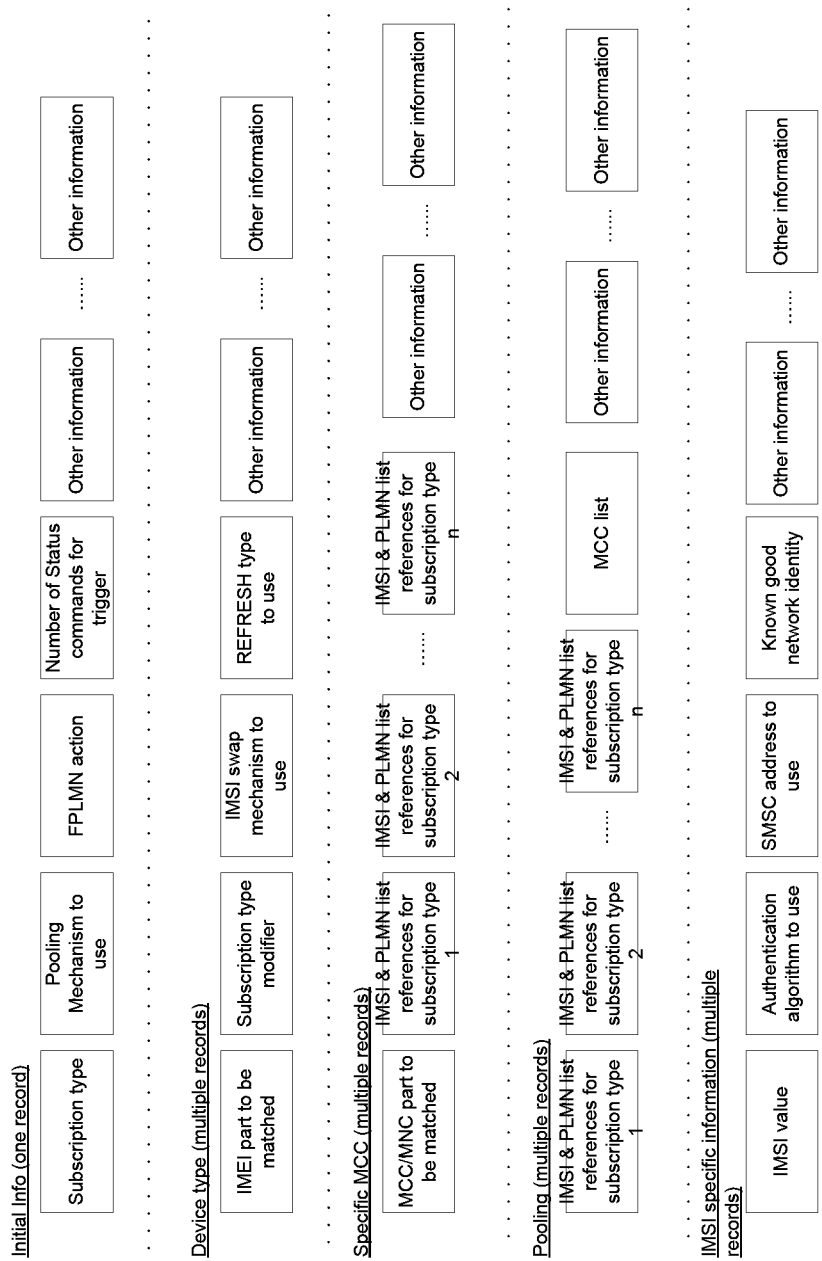
FIG. 7 illustrates a data record structure for use in the process of FIG. 3.

FIG. 7 indicates the types of record held by the SIM in the course of this process and the respective record structures. A single initial information record will indicate, for example, a subscription type and a pooling mechanism to use. Device type records may indicate, for example, modifiers to a subscription type (an initial voice and data subscription may for example need modification to indicate that the device is a BlackBerry, with its own data handling protocols). A specific MCC record may effectively divide IMSI and PLMN lists by appropriate subscription, as may pooling records. A specific IMSI record may indicate not only the IMSI, but authentication, address and network identity information too.

The information used for these processes may be used for more than IMSI selection. The method may in embodiments include a query process that allows other applications to ask whether the current IMSI is the correct IMSI. This method may also generate an event for other applications when the correct IMSI is selected and the handset is in a stable state. This event will have a means for the receiving application to register and de-register for this alert. All aspects of the process may be logged in this way.

This approach allows for reliable management of identity at a mobile handset, reliability being improved by enabling the procedure to be optimised for different handset and subscription types—while described here with reference to IMSI data, it is also applicable to other types of identity for use with a communication network. This approach is also effectively used in combination with an IMSI Broker as discussed in WO 2011/036484, which can dynamically provide new identities and supporting information and parameters to a mobile handset, and which can also be a source of trigger events to prompt a change of IMSI where this is determined to be desirable.

The operational data contained in a database record of IMSI data may optionally contain primary data or links or pointers, optionally nested, to additional operational data contained other SIM database files.

The SIM database may optionally be pre-loaded at manufacture, or modified by OTA information sent from the host system.

The term territory used herein is intended to mean any specific locality, this may be in terms of countries, regions and possible even for given networks.

The terms mobile phone, handset, mobile terminal, communications device may be considered as being interchangeable within this document.

A person skilled in the art will appreciate that the present invention is not limited to details of the described embodiments, rather numerous changes and modifications may be made without departing from the spirit and scope of the invention as set out in the appended claims.

The invention claimed is:

1. A method of managing identities for use in a mobile telecommunications device in a telecommunications network, the method comprising:
triggering an identity management process in a subscriber identity module of the mobile telecommunications device connected to a mobile telecommunications network, wherein each step of the identity management process is performed within the subscriber identity module;
detecting at the mobile telecommunications device one or more parameters associated with the mobile telecommunications device;
in the identity management process performed within the subscriber identity module, selecting an identity management rule determined by the one or more parameters detected;
in the identity management process performed within the subscriber identity module, searching an identity database in the mobile telecommunications device wherein each record comprises an identity stored in the subscriber identity module and additional identity information including an MCC and MNC for each identity, wherein the searching prioritises records according to the identity management rule;
in the identity management process performed within the subscriber identity module, selecting an identity when a record conforming to the identity management rule is found in said searching, wherein selecting an identity comprises matching of some or all of an MCC or an MNC value and then selecting a pooling mechanism, the pooling mechanism being used to provide an appropriate IMSI; and
in the identity management process performed within the subscriber identity module, modifying an active identity of the mobile telecommunications device to be the selected identity when the active identity is not already the selected identity.

2. A method as claimed in claim 1, wherein each said identity comprises an IMSI.

3. A method as claimed in claim 1, wherein the one or more parameters comprise a handset type.

4. A method as claimed in claim 3, wherein the handset type is determined from the TAC code in the IMEI of the mobile telecommunications device.

5. A method as claimed in claim 1, wherein the one or more parameters comprise a subscription type associated with the mobile telecommunications device, wherein the subscription type relates to one or more of a device operating system and a communication type.

6. A method as claimed in claim 1, wherein if there is no match established by the identity management rule to a specific identity, a new identity is selected from a pool of matching identities.

7. A method as claimed in claim 1, wherein a process of modifying the active identity is determined according to the one or more parameters of the device.

8. A method as claimed in claim 1, wherein if on modifying the active identity no service is provided to the new active identity, the active identity is modified to a backup identity different from the identity for which no service was provided.

9. A subscriber identity module for use in a mobile telecommunications device and having a plurality of identities for use in a mobile telecommunications network,
wherein the subscriber identity module comprises of a memory and a processor, wherein the memory comprises an identity management process for execution by the processor and an identity database, and wherein when installed within the mobile telecommunications device the processor is adapted:
on receiving a trigger within the mobile telecommunications device, to initiate the identity management process;
to receive a detection of one or more parameters associated with the mobile telecommunications device;
in the identity management process, to select an identity management rule determined by the one or more parameters detected;
in the identity management process, to search an identity database in the mobile telecommunications device wherein each record comprises an identity stored in the memory of the subscriber identification module and additional identity information including an MCC and MNC for each identity, wherein the searching prioritises records according to the identity management rule;
in the identity management process, to select a selected identity from the identity database when a record conforming to the identity management rule is found in said searching wherein selecting an identity comprises matching of some or all of an MCC or an MNC value and then selecting a pooling mechanism, the pooling mechanism being used to provide an appropriate IMSI; and
in the identity management process, to modify an active identity of the mobile telecommunications device to be the selected identity when the active identity is not already the selected identity.

10. A subscriber identity module as claimed in claim 9, wherein each of the plurality of identities are IMSIs.

11. A subscriber identity module as claimed in claim 9, wherein the one or more parameters comprise a handset type.

12. A subscriber identity module as claimed in claim 11, wherein the handset type is determined from the TAC code in the IMEI of the mobile telecommunications device.

13. A subscriber identity module as claimed in claim 9, wherein the one or more parameters comprise a subscription type associated with the mobile telecommunications device, wherein the subscription type relates to one or more of a device operating system and a communication type.

14. A subscriber identity module as claimed in claim 9, wherein the additional information comprises an MCC and an MNC for each identity.

15. A subscriber identity module as claimed in claim 14, wherein the identity management rule allows for selection of an identity based on matching of some or all of an MCC or an MNC value.

16. A subscriber identity module as claimed in claim 14, wherein if there is no match established by the identity management rule to a specific identity, a new identity is selected from a pool of matching identities.

17. A subscriber identity module as claimed in claim 9, wherein a process of modifying the active identity is determined according to the one or more parameters of the device.

18. A subscriber identity module as claimed in claim 9, wherein if on modifying the active identity no service is provided to the new active identity, the active identity is modified to a backup identity different from the identity for which no service was provided.

* * * * *